US009961728B2

(12) United States Patent
Elferich et al.

(10) Patent No.: US 9,961,728 B2
(45) Date of Patent: May 1, 2018

(54) DRIVER DEVICE AND DRIVING METHOD (71) Applicant: PHILIPS LIGHTING HOLDING B.V., Eindhoven (NL)

(72) Inventors: Reinhold Elferich, Eindhoven (NL); David Llewellyn John, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days. days.

(21) Appl. No.: 15/500,873

(22) PCT Filed: Jul. 27, 2015

(86) PCT No.: PCT/EP2015/067095
§ 371 (c)(1),
(2) Date: Jan. 31, 2017

(87) PCT Pub. No.: WO2016/020213
PCT Pub. Date: Feb. 11, 2016

(65) Prior Publication Data
US 2017/0223792 A1 Aug. 3, 2017

(30) Foreign Application Priority Data
Aug. 7, 2014 (EP) .................................... 14180140

(51) Int. Cl.
H05B 37/02 (2006.01)
H05B 33/08 (2006.01)
(Continued)

(52) U.S. Cl.
CPC ...... *H05B 33/0815* (2013.01); *H02M 1/4241* (2013.01); *H02M 3/33507* (2013.01)

(58) Field of Classification Search
CPC ............ H05B 33/0815; H02M 1/4241; H02M 3/33507
(Continued)

(56) References Cited

U.S. PATENT DOCUMENTS 7,881,084 B2 * 2/2011 Lin ....................... H02M 7/523
315/307
8,102,678 B2   1/2012 Jungreis
(Continued)

FOREIGN PATENT DOCUMENTS

EP          2635092 A1    9/2013
WO       2012085759 A2    6/2012
(Continued)

OTHER PUBLICATIONS

P. Ganesh et al, "Improved Input Voltage and Fixed Frequency Single Stage SPRC-LLC Resonant Converter With Reduced Bus Capacitor Voltage", VSRD International Journal of Electrical, Electronics & Communication Engineering, vol. 2, No. 10, Oct. 10, 2012, ISSN No. 2319-2232; p. 801-806.
(Continued)

*Primary Examiner* — Don Le
(74) *Attorney, Agent, or Firm* — Akarsh Belagodu (57) ABSTRACT A driver device (10) for driving a load (22), in particular for driving an LED unit comprising one or more LEDs is presented. The driver device comprises input terminals (12, 14) for connecting the driver device to an electrical power supply (16) for receiving a variable input voltage (V10) from the electrical power supply, a converter unit (25) for converting the input voltage (V10) to an output voltage (V12) including a resonant converter (40) and a switch unit (26), wherein the switch unit is adapted to provide a chopped voltage of the input voltage as a drive voltage (V16) to the resonant converter, and a control unit (34) connected to the
(Continued)

switch unit for controlling a pulse frequency ($f_P$) of the chopped voltage, wherein the control unit is adapted to control an input current ($I10$) drawn from the electrical power supply by controlling the pulse frequency of the chopped voltage on the basis of a measured value of the variable input voltage.

20 Claims, 3 Drawing Sheets

(51) Int. Cl.
*H02M 3/335* (2006.01)
*H02M 1/42* (2007.01)

(58) Field of Classification Search
USPC .......................................................... 315/201
See application file for complete search history.

(56) References Cited

U.S. PATENT DOCUMENTS

| | | | |
|---|---|---|---|
| 8,503,199 | B1 | 8/2013 | Chapuis et al. |
| 9,214,851 | B1 * | 12/2015 | Mao ................... H02M 1/08 |
| 9,320,091 | B2 * | 4/2016 | Gaknoki ............ H05B 33/0815 |
| 2002/0011801 | A1 | 1/2002 | Chang |
| 2008/0231211 | A1 * | 9/2008 | Baarman ........... H02M 3/33523 |
| | | | 315/294 |
| 2009/0072626 | A1 * | 3/2009 | Watanabe ........... H02M 3/1588 |
| | | | 307/85 |
| 2011/0080102 | A1 | 4/2011 | Ge et al. |
| 2011/0089846 | A1 * | 4/2011 | Ido ..................... H05B 33/0818 |
| | | | 315/209 R |
| 2012/0043892 | A1 | 2/2012 | Visser et al. |
| 2014/0091718 | A1 * | 4/2014 | Brinlee .............. H05B 33/0815 |
| | | | 315/185 R |
| 2014/0160807 | A1 | 6/2014 | Han et al. |
| 2015/0016152 | A1 * | 1/2015 | Kojima ................ G03G 15/80 |
| | | | 363/21.02 |
| 2017/0086272 | A1 * | 3/2017 | O'Neil ............... H05B 33/0845 |
| 2017/0154739 | A1 * | 6/2017 | Sugahara ................ H01H 9/54 |

FOREIGN PATENT DOCUMENTS

| | | |
|---|---|---|
| WO | 2013151217 A1 | 10/2013 |
| WO | 2014064578 A1 | 5/2014 |

OTHER PUBLICATIONS

AN2644 Application Note, "An introduction to LLC resonant half-bridge converter", pp. 1-64.

* cited by examiner

DRIVER DEVICE AND DRIVING METHOD

CROSS-REFERENCE TO PRIOR APPLICATIONS

This application is the U.S. National Phase application under 35 U.S.C. § 371 of International Application No. PCT/EP2015/067095 filed on Jul. 27, 2015 which claims the benefit of European Patent Application No. 14180140.7, filed on Aug. 7, 2014. These applications are hereby incorporated by reference herein.

FIELD OF THE INVENTION

The present invention relates to a driver device and a corresponding driving method for driving a load, in particular for driving an LED unit comprising one or more LEDs. Further, the present invention relates to a light apparatus comprising one or more lighting devices, in particular one or more LEDs.

BACKGROUND OF THE INVENTION

In the field of driver devices, in particular in the field of LED drivers, high power factors and a safety isolated output are demanded. These drivers can either employ a PFC front end stage, with an isolating output stage or can use an isolating input stage that operates at a high power factor and which may employ a second non-isolated power stage. A corresponding driver device for driving LEDs is e.g. known from WO 2012/085759 A2.

Isolating PFC stages are usually formed as fly-back converters, which can provide high gain ratios which are needed for the respective PFC operation, however, the power density and the efficiency of fly-back converters is too low for applications that require miniature and/or efficient drivers, mainly due to the semiconductor losses in the switches and the rectifiers. Also the maximum power that is achievable with flyback converter designs is limited chiefly due to practical limits from the transformer.

Resonant converters which are also used for isolated PFC stages like the LC parallel resonant converters and the LCL converters—if operated close to or at resonance—have an input current proportional to the output voltage, which can in principle be utilized for PFC operation, however, the additionally needed isolation requires up to three electromagnetic components, which result in a low power density and high costs. Also class E converters provide high power factor operations, however, the power transistor has to withstand voltage stress that goes largely beyond limits of typical low cost devices.

As an isolating output stage, resonant LLC converters are widely used e.g. for professional LED drivers or for power supplies in consumer or office electronics equipment because of the high efficiency and the small size, however, the LLC converters have a limited gain ratio.

SUMMARY OF THE INVENTION

It is an object of the present invention to provide an improved driver device for driving a load, e.g. a constant voltage load or a constant current load in particular for driving an LED unit comprising one or more LEDs which can be used for PFC operation and has a high efficiency and a small size. It is further an object of the present invention to provide a corresponding improved driving method for driving a load, e.g. a constant voltage load or a constant current load in particular for driving an LED unit comprising one or more LEDs. Further, it is an object of the present invention to provide a corresponding light apparatus.

According to one aspect of the present invention, a driver device for driving a load is provided, comprising:
  input terminals for connecting the driver device to an electrical power supply for receiving a variable input voltage from the electrical power supply,
  a converter unit for converting the input voltage to an output voltage including a resonant converter and a switch unit, wherein the switch unit is adapted to provide a chopped voltage of the input voltage as a drive voltage to the resonant converter, and
  a control unit connected to the switch unit for controlling a pulse frequency of the chopped voltage, wherein the control unit is adapted to control an input current drawn from the electrical power supply by controlling the pulse frequency of the chopped voltage on the basis of a measured value of the variable input voltage.

According to another aspect of the present invention, a driving method for driving a load is provided, comprising the steps of:
  converting a variable input voltage to an output voltage by means of a converter unit including a resonant converter for powering the load, wherein a chopped voltage of the input voltage is provided as a drive voltage to the resonant converter by means of a switch unit, and
  controlling an input current drawn from an electrical power supply on the basis of a measured value of the variable input voltage received from the electrical power supply by controlling a pulse frequency of the chopped voltage.

According to another aspect of the present invention, a lighting apparatus is provided comprising one or more lighting devices, in particular one or more LEDs, and a driver device of this kind for driving the lighting devices.

Preferred embodiments of the invention are defined in the dependent claims. It shall be understood that the claimed method has similar and/or identical preferred embodiments as the claimed device and as defined in the dependent claims.

The present invention is based on the idea to utilize the advantages of a resonant converter like an LLC converter which have a high efficiency and a small size and to control the input current so that a PFC operation is possible. Since a power factor of a resonant converter is dependent on the resonance frequency, the current drawn by the converter unit and the respective power factor are dependent on a frequency of the drive voltage provided to the resonant converter. Hence, the current drawn by the electromagnetic converter unit and the power factor can be controlled by controlling the pulse frequency of the chopped voltage provided to the resonant converter so that a PFC operation of the converter unit can be achieved by controlling a current drawn by the converter unit according to a measured value of the input voltage of the respective driver device. Consequently, the advantages of the resonant converters can be utilized and operated as a PFC stage, so that a PFC operation with high efficiency and small size can be achieved.

In a preferred embodiment, the measured value of the variable input voltage is a phase of the input voltage and wherein the control unit is adapted to control the input current on the basis of a phase of the input voltage. This is a possibility to set the input current drawn from the electrical power supply in phase with the input voltage, so that a PFC operation and a high power factor can be achieved.

In a preferred embodiment, the driver device further comprises a rectifier connected to the input terminals for rectifying the input voltage to a rectified voltage and for providing the rectified voltage or the rectified input voltage to the converter unit, and wherein an envelope of the chopped voltage corresponds to the rectified voltage or an absolute value of the input voltage. This is a possibility to drive the resonant converter with low technical effort, since the drive voltage corresponds to the rectified input voltage chopped by the switch unit. In other words, the rectified input voltage is directly provided to the switch unit for providing the chopped voltage as the drive voltage. Hence, the use of a filter capacitor or boost converter can be avoided.

In a further preferred embodiment, the chopped voltage has a half sinusoidal envelope corresponding to the rectified voltage. In other words, the peak values of the chopped voltage are identical with the corresponding absolute values of the input voltage. This is a possibility to directly provide the rectified and chopped sinusoidal input voltage such as mains voltage to the resonant converter with low technical effort.

The chopped voltage is in particular a unipolar or a rectified chopped voltage of the input voltage.

In a preferred embodiment, the converter unit comprises an electromagnetic transformer connected to the resonant converter. This is a possibility to achieve a safe isolation from the input terminals with low technical effort.

In a preferred embodiment, the resonant converter is an LLC converter. This is a possibility to increase the efficiency and to reduce the size of the converter unit with low technical effort.

In a preferred embodiment, the control unit is adapted to control the pulse frequency on the basis of a measured state variable of the resonant converter. This is a possibility to utilize the resonant converter as self-oscillating resonant converter which can be controlled with low technical effort on the basis of the measured variable.

In a preferred embodiment, the measured variable of the resonant converter is a voltage of a capacitor or of the electromagnetic transformer of the converter unit. This is a possibility to further reduce the technical effort for controlling a self-oscillating resonant converter.

In a preferred embodiment, the switch unit is further controlled on the basis of a threshold value defined for the voltage of the capacitor or of the electromagnetic transformer of the converter unit.

In a preferred embodiment, the switch unit comprises two controllable switches for converting the input voltage to the chopped drive voltage, wherein a node between the controllable switches is directly connected to the resonant converter to provide the chopped drive voltage directly to the resonant converter. This is a possibility to provide a chopped drive voltage on the basis of the input voltage to the resonant converter, wherein the frequency of the chopped voltage can be controlled with low technical effort.

In a preferred embodiment, the switch unit is formed as a half bridge. This is a possibility to reduce the technical effort and to provide a switch unit which has an increased resistance against over-voltages.

In a preferred embodiment, the control unit is connected to a measurement unit for determining an output power of the driver device, and wherein the control unit is adapted to control the input current on the basis of the measured output power. This is a possibility to control the output voltage or current.

In a preferred embodiment, the control unit is connected to a current measurement unit for measuring an output current of the electromagnetic converter unit and, wherein the control unit is adapted to control the output current by controlling the pulse frequency. This is a possibility to provide a desired drive current for driving a load and to achieve a high power factor of the driver device.

In a preferred embodiment, the control unit is connected to a voltage measurement unit for measuring the output voltage of the electromagnetic converter unit, wherein the control unit is adapted to control the output voltage by controlling the pulse frequency. This is a possibility to control the output voltage to a desired value and to achieve a high power factor.

In a preferred embodiment, the control unit is adapted to control the output current or the output voltage as a control variable on the basis of a predefined desired value.

This is a possibility to set the output current or the output voltage precisely to a predefined value with low technical effort.

In a preferred embodiment, the control unit is adapted to control the pulse frequency of the chopped voltage by controlling a switching frequency of the switch unit. This is a possibility to provide the chopped voltage to the electromagnetic converter unit with low technical effort.

In a preferred embodiment, the control unit is adapted to control the input current to an at least sectionally constant value within each period of the input voltage. This is a possibility to reduce the technical effort for controlling the input current, wherein the input current can be set in phase with the input voltage and still a high power factor can be achieved. In particular, the input current is controlled to a squared shape or a trapezoid shape in phase with the input voltage.

In an alternative embodiment, the control unit is adapted to control the input current to a sinusoidal curve in phase with the input voltage. This is a possibility to achieve a high power factor of the driver device.

In a preferred embodiment, the switch unit is connected via a rectifier to the input terminals, wherein the drive voltage is a rectified chopped voltage. This is a possibility to achieve a high power factor of the driver device.

As mentioned above, the driver device and the driving method can utilize the advantages of resonant converters in terms of efficiency and size and can be operated as PFC stages, since the current drawn from the electrical power supply can be easily controlled on the basis of the measured value of the input voltage. The input current can be controlled with low technical effort, since the current drawn by a converter unit is dependent on a frequency of the drive voltage provided to the resonant converter.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
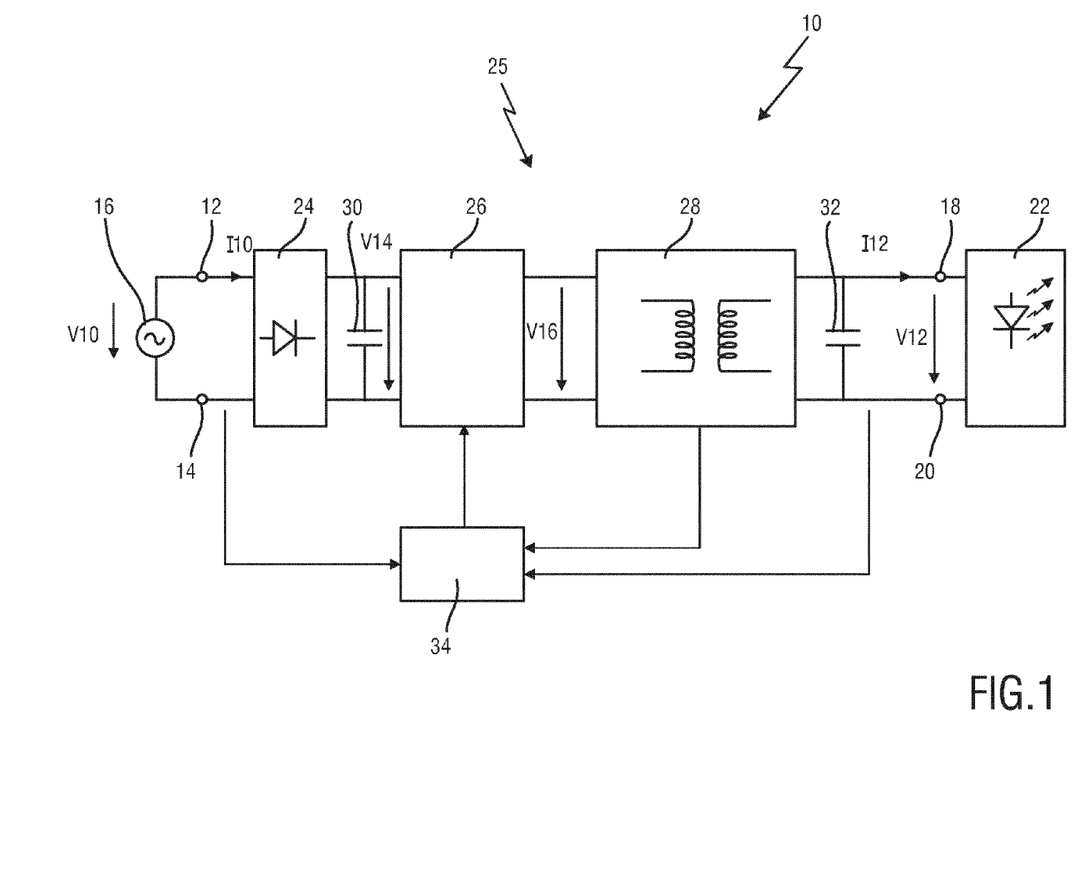
FIG. 1 shows a schematic block diagram of a driver device for driving a load.

FIG. 1 shows a schematic block diagram of a driver device generally denoted by 10. The driver device 10 comprises input terminals 12, 14 for connecting the driver device 10 to an electrical power supply 12, in particular to a voltage supply 12 which provides a supply voltage V10 to the driver device 10. The electrical power supply 16 is preferably mains which provides mains voltage as the supply voltage V10 to the driver device 10. The driver device 10 further comprises output terminals 18, 20 for providing an output voltage V12 and an output current I12 to a load 22 for powering the load 22, which is in the particular embodiment shown in FIG. 1 formed as an LED unit 22.

The driver device 10 comprises a rectifier 24, which is connected to the input terminals 12, 14 for rectifying the supply voltage V10 or the input voltage V10 and for providing a rectified voltage V14. The driver device 10 further comprises a converter unit 25 including a switch unit 26 and an electromagnetic converter unit 28. The switch unit 26 is directly connected to the rectifier 24 for receiving the rectified voltage V14 and for providing a drive voltage V16. The electromagnetic converter unit 28 comprises a resonant converter, which is connected between the switch unit 26 and an electromagnetic transformer of the electromagnetic converter unit 28. The switch unit 26 provides the drive voltage V16 to the resonant converter of the electromagnetic converter unit 28 for driving the electromagnetic converter unit 28. The electromagnetic converter unit 28 is connected to the output terminals 18, 20 for providing the output voltage V12 and the output current I12 to the output terminals 18, 20 and for powering the load 22.

The driver device 10 may further comprise a filter device 30, which is connected to the rectifier 24 for filtering the rectified voltage V14. The filter device 30 is in this particular case formed as a capacitor 30. The driver device 10 may further comprise a filter capacitor 32 which is connected to the output terminals 18, 20 for filtering the output voltage V12 and for providing a constant voltage as the output voltage V12 to the load 22.

The switch unit 26 is formed as an inverter switch or a chopper which receives the rectified voltage V14 and provides the drive voltage V16 as a pulsating voltage or a chopped voltage to the resonant converter of the electromagnetic converter unit 28. The switch unit 26 is controlled by a control unit 34, wherein the control unit 34 controls the pulse frequency of the pulsating or chopped voltage V16 in order to set or control an input current I10 drawn from the electrical power supply 16 as described in detail in the following.

The electrical power transmitted by the electromagnetic converter unit 28 is dependent on the frequency of the respective drive voltage V16 i.e. in this particular case dependent on the pulse frequency of the pulsating or chopped voltage V16 provided by the switch unit 26. Hence, the electrical power converted by the electromagnetic converter unit 28 and the input current I10 drawn from the electric power supply 16 can be controlled by controlling the pulse frequency of the pulsating or chopped voltage V16 via the switch unit 26 respectively. In a preferred embodiment, the switch unit 26 comprises a half bridge or a full bridge inverter, which can be easily controlled by the control unit 34 so that almost any waveform of the input current I10 can be provided. The frequency of the pulsating voltage V16 or the chopped voltage V16 is e.g. in the range between 50 and 150 kHz or—for another converter—e.g between 500 kHz and 1.5 MHz. The pulse frequency is determined by the components of the electromagnetic converter unit 28 i.e., the inductance of the inductive components and the capacitance of the electromagnetic converter unit. The pulse frequency is further determined by the input voltage and power.

A control unit 34 is connected to a measurement unit (not shown) for measuring the supply voltage V10 or the rectified voltage V14 and controls the input current I10 on the basis of the measured supply voltage V10 or the measured rectified voltage V14 by controlling or setting the pulse frequency of the pulsating voltage V16. The control unit 34 preferably controls the input current I10 to be in phase with the supply voltage V10 so that the driver device 10 forms a PFC stage and behaves comparable to an ohmic resistor.

The control unit 34 is further connected to a measurement device (not shown) for measuring the output voltage V12 and/or the output current I12 and controls the input current I10 further on the basis of the output voltage V12 or the output current I12. In that case, the control unit 34 is adapted to control the output voltage V12 or the output current I12 on the basis of a desired value, which may be predefined or adjustable during the operation, so that the load 22 is driven by a desired output voltage V12 or a desired output current I12.

In an embodiment, the resonant converter of the electromagnetic converter unit 28 is formed as an LLC converter comprising one capacitor and two inductors forming a resonant circuit, wherein the converted electrical power is increasing at pulse frequencies of the pulsating or chopped voltage V16 close to the resonance frequency of the resonant converter.

The control unit 34 can be connected to a measurement device for measuring at least one state variable of the resonant converter, in particular a voltage dropping across the capacitor of the resonant converter or across the transformer can be measured and provided to the control unit 34 so that the input current I10 can be controlled on the basis of the respectively measured state variable of the resonant converter, which implicitly adjusts the pulse frequency of the drive voltage V16. In a particular case, the resonant converter is made self-oscillating , i.e., it forms a part of an oscillator.

The driver device 10 in general can thus be provided as a PFC converter having a high efficiency and a small size, so that this driver device can be utilized for driving LED units and can be connected to mains as a power supply.

Figure 2:
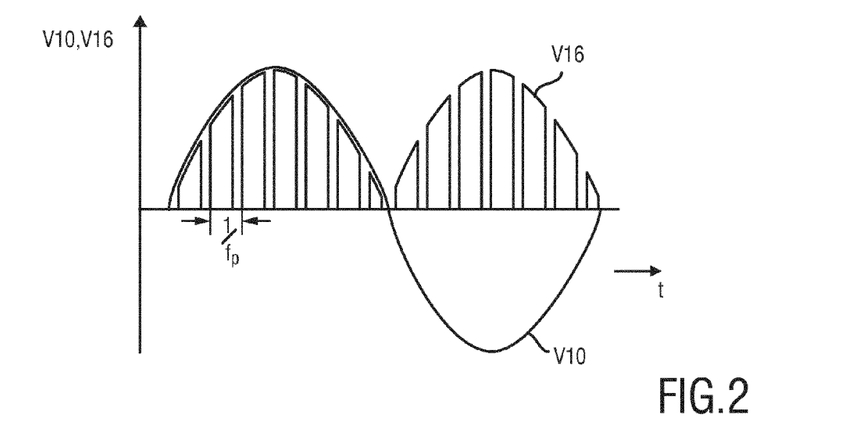
FIG. 2 shows a timing diagram of an input voltage and a chopped drive voltage for driving an electromagnetic converter unit.

FIG. 2 shows a timing diagram of the supply voltage V10 and the drive voltage V16. The supply voltage V10 has a sinusoidal alternating waveform and has a frequency of 50 Hz in the case that the electrical power supply 16 is mains. The drive voltage V16 is a unipolar voltage since the rectifier 24 rectifies the bipolar sinusoidal supply voltage V10 to the rectified voltage V14. The rectified voltage V14 has a corresponding full-wave rectified waveform as the input voltage V10. In this case, the rectified voltage V14 has a DC full-wave sinusoidal waveform. Hence, the absolute values of the input voltage V10 and the rectified voltage V14 are identical. Further, as shown in FIG. 2, the amplitude or the magnitude of the rectified voltage V14 and the input voltage V10 are identical. The rectified voltage V14 is chopped by means of the switch unit 26 so that the drive voltage V16 is a pulsating or chopped voltage V16 having a half sinusoidal envelope corresponding to the rectified voltage V14. Hence, the peak values of the chopped voltage V16 are identical with the corresponding absolute values of the input voltage V10.

The pulse frequency $f_P$ of the pulsating voltage V16 is variable or can be set by means of the control unit 34 and is e.g. in the range of 50-150 kHz.

By controlling the pulse frequency or the switching frequency of the pulsating voltage V16, the input current I10 can be controlled and set to a desired waveform so that in a particular embodiment, a PFC operation of the driver device 10 can be achieved.

Figure 3:
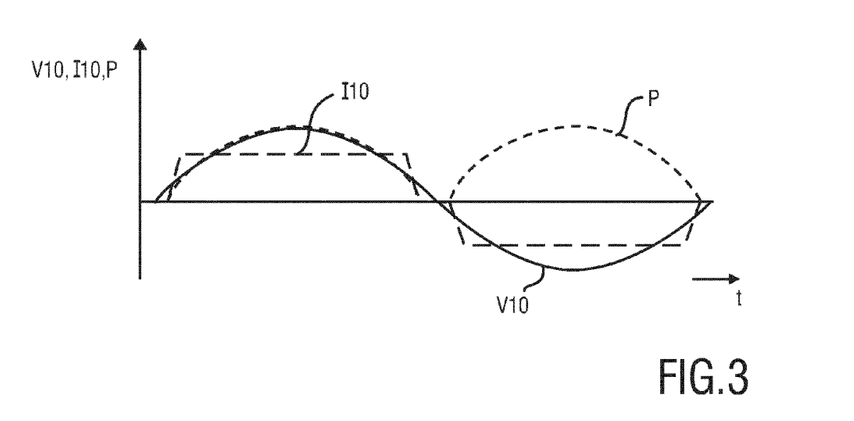
FIG. 3 shows a timing diagram of an input voltage, an input current and an electrical power drawn by the driver device.

FIG. 3 shows a timing diagram of the supply voltage V10, the input voltage V10 and the transmitted electrical power P drawn from the electrical power supply 16. The timing diagram shows one period of the sinusoidal supply voltage V10 which has in the case that the electrical power supply 16 is mains a frequency of 50 Hz. The input current I10, which is drawn from the electrical power supply 16 and controlled by the pulsating frequency $f_P$ or the switching frequency $f_P$ of the drive voltage V16 has a trapezoidal shape during each half wave of the input voltage V10 and is in phase with the input voltage V10. Hence, the electrical power P drawn from the electrical power supply 16 has a pulsating shape corresponding to the respective half waves of the input voltage V10. In this particular case, the power factor of the electromagnetic converter unit is less than 1, since the waveform of the supply voltage V10 and the input current I10 are not identical. If the input current I10 is also controlled to be sinusoidal and in phase with the input voltage V10, the power factor would be 1. In another embodiment, the input current I10 can be controlled to be constant over each half wave of the supply voltage V10. This is in general a possibility to reduce the control effort, since the input current I10 can be set to a constant value at least sectionally during each half wave of the input voltage V10.

Figure 4:
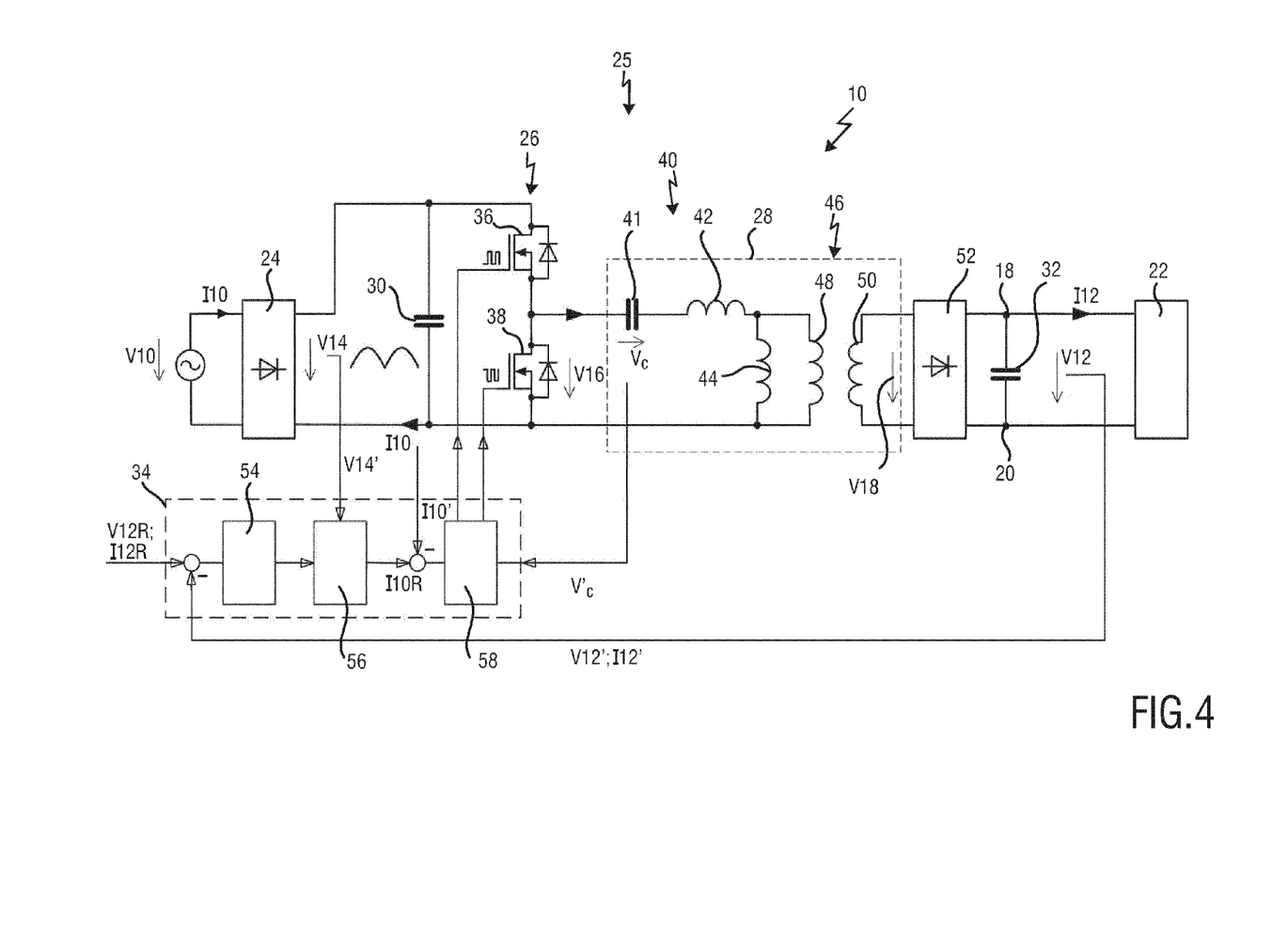
FIG. 4 shows a detailed block diagram of a driver device for driving a load.

FIG. 4 shows a detailed block diagram of the driver device 10 shown in FIG. 1. Identical elements are denoted by identical reference numerals, wherein here merely the differences are described in detail. The switch unit 26 is formed as a half bridge comprising two controllable switches 36, 38 connected in series to each other, wherein the resonant converter 40 of the electromagnetic converter unit 28 is directly connected to a node between the controllable switches 36, 38 in order to receive the drive voltage V16. The resonant converter 40 is formed as an LLC resonant converter comprising a series capacitor 41, a series inductor 42, a parallel inductor 44 and the electromagnetic transformer 46 comprising a primary winding 48 and a secondary winding 50. The series capacitor 41 and the inductors 42, 44, 48 form a resonant circuit of the resonant converter unit 28, wherein the maximum power can be achieved if the drive voltage has a pulse frequency $f_P$ or a switching frequency $f_P$ corresponding to the resonance frequency of the resonance circuit.

The secondary winding 50 provides a transformer voltage, which is provided to a rectifier 52, which rectifies the transformer voltage V18 so that the output voltage V12 is a constant voltage filtered by the filter capacitor 32. This output capacitor is the designed for the low frequency (100 Hz) buffering, whereas the input capacitor 30 is small and designed to filter the switching frequency (e.g. 100 kHz) only. The input capacitor 30 usually depends on the power rating and on the input voltage. E.g., the input capacitor comprises a capacitance of less than 10 nF/W if a high power factor is desired at 230 Vac and 50 Hz. The output capacitor depends on the power and voltage rating as well as on the desired output voltage ripple. E.g., a capacitance of at least 1 µF/W is required for a +−5% ripple at 200 Vdc. This rectifier 52 may be a bridge rectifier. In an alternative embodiment, the electromagnetic transformer 46 may comprise a tapped secondary winding for rectifying the transformer voltage V18 and for providing a unipolar voltage as the output voltage V12 to the load 22.

The control unit 34 is shown in FIG. 4 in detail, wherein the control unit 34 comprises a driver device for providing control signals to the controllable switches 36, 38 for driving the switch unit 26 accordingly. The control unit 34 receives a measured output voltage V12 or the measured output current I12 and correspondingly a reference value V12R or I12R as a desired value to be achieved at the output terminals 18, 20. The reference value can be predefined or can be selectable by an operator.

A first control device 54 of the control unit 34 receives a difference between the respective reference value V12R, I12R as a control error and the measurement value of the output voltage V12' or the output current I12' from an adder. The first control device 54 provides a control factor corresponding to the average output power of the driver device 10 to a multiplexer 56, which receives a measurement value V14' corresponding to the rectified voltage V14. The multiplexer 56 determines an input current reference value I10R, which is compared to the measured input current I10. The input current I10 is controlled by means of the switching frequency of the controllable switches 36 by means of a second control device 58, which alternatively, may also receive a capacitor voltage Vc' of the series capacitor 50 in order to control the input current I10 in a self oscillating manner on the basis of a measured value of the resonance converter 28. In this case the controllable switches 36, 38 are controlled on the basis of a threshold value for the capacitor voltage Vc, wherein the switches 36, 38 are switched when the capacitor voltage Vc reaches the threshold value. The series capacitor 41, the second control device 58 and the switch unit 26 forms in this case an oscillating loop. The second control device 58 further comprises the drivers for driving the controllable switches 36, 38.

The input current I10 is controlled virtually corresponding to the formula:

$$I10 = V14 * P12 * c0$$

wherein P12 is the output power provided at the output terminals 18, 20 and c0 is a constant factor depending on the peak input voltage.

By means of this control loop from the resonant converter to the PFC stage, the input current I10 can be controlled corresponding to the supply voltage V10 precisely so that a PFC stage with high efficiency and small size can be achieved.

It shall be understood that the input current I10 can also in simplified embodiments be controlled on the basis of the rectified voltage V14 or the capacitor voltage Vc or the output voltage V12 or the output current I12 as the control variable so that the technical effort is further reduced.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an"

does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. Driver device for driving a load, in particular for driving an LED unit comprising one or more LEDs, comprising:
    input terminals for connecting the driver device to an electrical power supply for receiving an input voltage as a variable voltage from the electrical power supply,
    a converter unit for converting the input voltage to an output voltage including a resonant converter having a resonant frequency and a switch unit, wherein the switch unit is adapted to provide a chopped voltage of the input voltage as a drive voltage to the resonant converter, and
    a control unit connected to the switch unit for controlling a pulse frequency ($f_P$) of the chopped voltage, wherein the control unit is adapted to control an input current drawn from the electrical power supply by controlling the pulse frequency of the chopped voltage as a function of the resonant frequency on the basis of a measured value of the variable input voltage, and wherein the control unit is further adapted to determine an input current reference value, and to compare the input current reference value to a measured value of the input current, wherein the input current drawn increases as the pulse frequency approaches the resonant frequency.

2. Driver device as claimed in claim 1, wherein the measured value is a phase of the input voltage and wherein the control unit is adapted to control the input current on the basis of a phase of the input voltage.

3. Driver device as claimed in claim 1, further comprising a rectifier connected to the input terminals for rectifying the input voltage to a rectified voltage and for providing the rectified voltage to the converter unit, and wherein an envelope of the chopped voltage corresponds to the rectified voltage.

4. Driver device as claimed in claim 1, wherein the converter unit comprises an electromagnetic transformer connected to the resonant converter.

5. Driver device as claimed in claim 1, wherein the resonant converter is an LLC converter, the LLC converter including at least one capacitor arranged in series with an inductor.

6. Driver device as claimed in claim 1, wherein the control unit is adapted to control the pulse frequency on the basis of a measured variable (Vc) of the resonant converter.

7. Driver device as claimed in claim 1, wherein the switch unit comprises two controllable switches for converting the input voltage to the chopped voltage, wherein a node between the controllable switches is directly connected to the resonant converter to provide the chopped voltage directly to the resonant converter.

8. Driver device as claimed in claim 1, wherein the control unit is connected to a measurement unit for determining an output power of the driver device, and wherein the control unit is adapted to control the input current on the basis of the measured output power.

9. Driver device as claimed in claim 1, wherein the control unit is connected to a current measurement unit for measuring an output current of the electromagnetic converter unit and wherein the control unit is adapted to control the output current by controlling the pulse frequency.

10. Driver device as claimed in claim 1, wherein the control unit is connected to a voltage measurement unit for measuring the output voltage of the electromagnetic converter unit and wherein the control unit is adapted to control the output voltage by controlling the pulse frequency.

11. Driver device as claimed in claim 4, wherein the control unit is adapted to receive a measured value of the output voltage or a measured value of an output current and correspondingly a reference value of the output voltage or a reference value of the output current as a desired value to be achieved at output terminals.

12. Driver device as claimed in claim 1, wherein the control unit is adapted to control the pulse frequency of the chopped voltage by controlling a switching frequency of the switch unit.

13. Driver device as claimed in claim 1, wherein the control unit is adapted to control the input current to an at least sectionally constant value within each half period of the variable input voltage.

14. Driving method for driving a load, in particular for driving an LED unit, comprising the steps of:
    converting a variable input voltage to an output voltage by means of a converter unit including a resonant converter having a resonant frequency for powering the load, wherein a chopped voltage of the input voltage is provided as a drive voltage to the resonant converter by means of a switch unit, and
    controlling an input current drawn from an electrical power supply on the basis of a measured value of the variable input voltage received from the electrical power supply by controlling a pulse frequency ($f_P$) of the chopped voltage as a function of the resonant frequency, wherein the input current drawn increases as the pulse frequency approaches the resonant frequency,
    determining an input current reference value; and
    comparing the input current reference value to a measured value of the input current.

15. Lighting apparatus comprising lighting devices, in particular one or more LEDs, and a driver device as claimed in claim 1 for driving the lighting devices.

16. Driver device for driving a load, in particular for driving an LED unit comprising one or more LEDs, comprising:
    input terminals for connecting the driver device to an electrical power supply for receiving an input voltage as a variable voltage from the electrical power supply,
    a converter unit for converting the input voltage to an output voltage including a resonant converter and a switch unit, wherein the switch unit is adapted to provide a chopped voltage of the input voltage as a drive voltage to the resonant converter, wherein the switch unit comprises two controllable switches for converting the input voltage to the chopped voltage, wherein a node between the controllable switches is directly connected to the resonant converter to provide the chopped voltage directly to the resonant converter, and
    a control unit connected to the switch unit for controlling a pulse frequency ($f_P$) of the chopped voltage, wherein the control unit is adapted to control an input current drawn from the electrical power supply by controlling the pulse frequency of the chopped voltage on the basis of a measured value of the variable input voltage, and wherein the control unit is further adapted to determine an input current reference value, and to compare the input current reference value to a measured value of the input current.

17. Driver device as claimed in claim 16, wherein the measured value is a phase of the input voltage and wherein the control unit is adapted to control the input current on the basis of a phase of the input voltage.

18. Driver device as claimed in claim 16, further comprising a rectifier connected to the input terminals for rectifying the input voltage to a rectified voltage and for providing the rectified voltage to the converter unit, and wherein an envelope of the chopped voltage corresponds to the rectified voltage.

19. Driver device as claimed in claim 16, wherein the converter unit comprises an electromagnetic transformer connected to the resonant converter.

20. Driver device as claimed in claim 16, wherein the resonant converter is an LLC converter, the LLC converter including at least one capacitor arranged in series with an inductor.

* * * * *